Dec. 30, 1969          N. S. SCHULMAN          3,487,183
              SPRING ACTUATED SAFETY SWITCH ASSEMBLY
Filed Oct. 12, 1967                          2 Sheets-Sheet 1
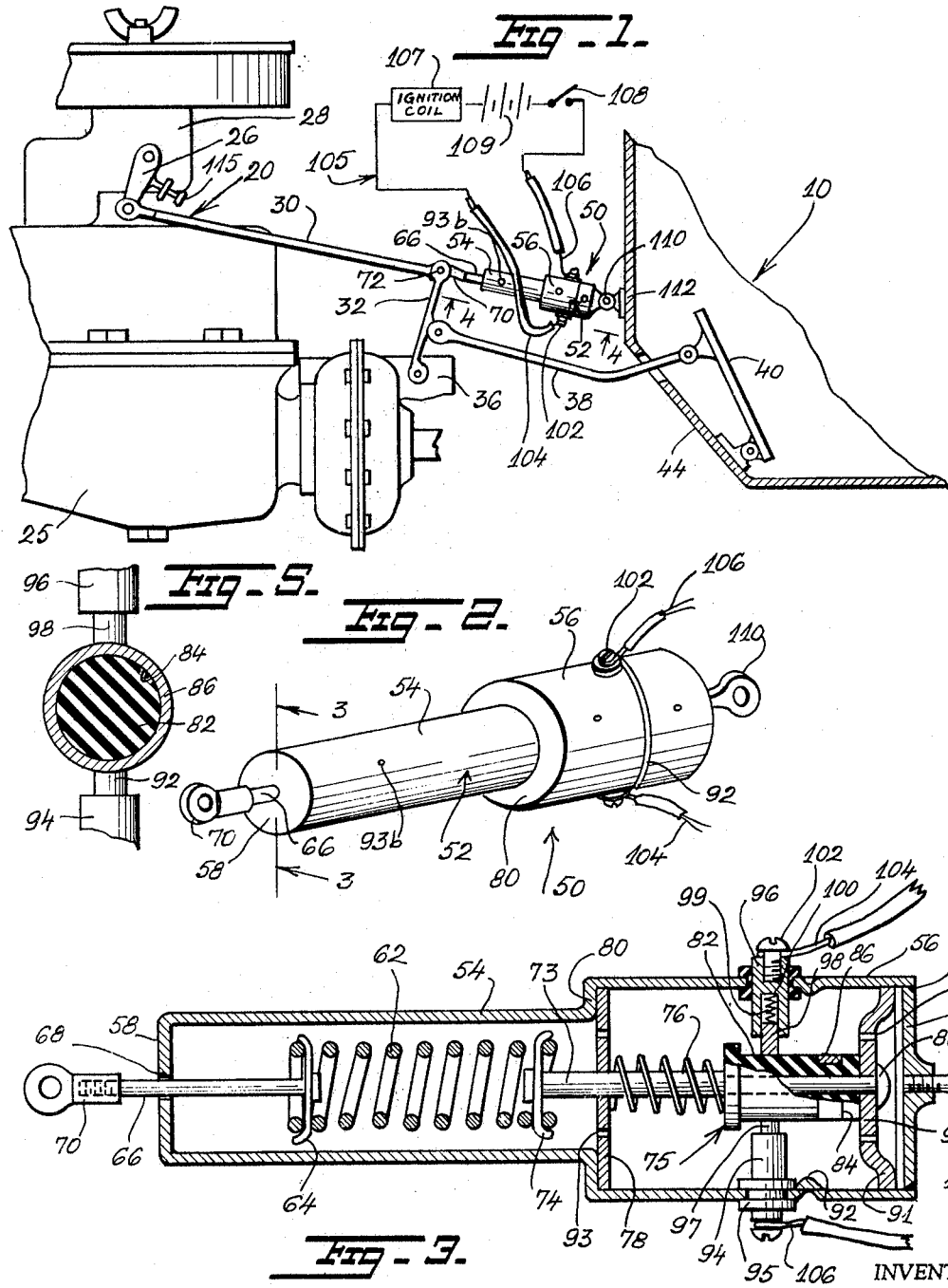
INVENTOR
Norman S. Schulman
BY
Polachek & Saulsbury
ATTORNEYS

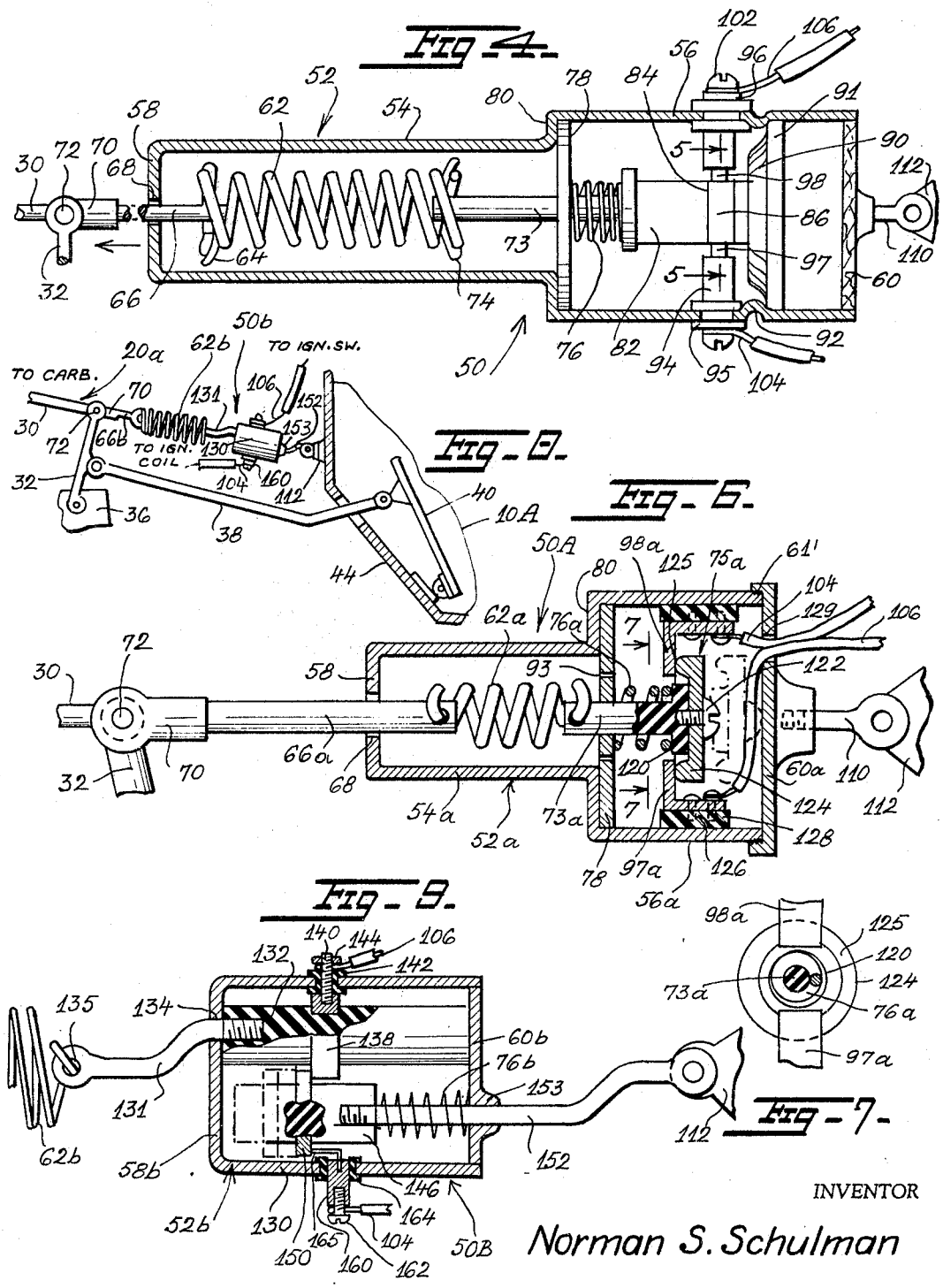

United States Patent Office 3,487,183
Patented Dec. 30, 1969

3,487,183
SPRING ACTUATED SAFETY SWITCH ASSEMBLY
Norman S. Schulman, 55 Grist Mill Lane,
Great Neck, N.Y. 11023
Filed Oct. 12, 1967, Ser. No. 674,848
Int. Cl. H01h 3/14
U.S. Cl. 200—61.89                                    1 Claim

ABSTRACT OF THE DISCLOSURE

A safety switch assembly is disposed in series with the accelerator return spring between the accelerator pedal and the linkage actuating the throttle of an automobile engine. The switch has spring biased contacts held closed when accelerator return spring is normally tensioned. The switch contacts are connected in the ignition circuit of the engine. If the accelerator return spring breaks or loses tension, the switch contacts open automatically to open the ignition circuit and stop the engine.

---

The invention concerns an automatically operated switch assembly arranged to open the ignition circuit of an automobile engine if the accelerator return spring fails.

The purpose of the accelerator safety switch assembly according to the invention is to prevent an internal combustion engine from running out of control while on full throttle, due to the failure of the accelerator return spring.

When the throttle is operated by foot control in a vehicle such as a conventional automobile, bus or truck, the accelerator pedal is held in normally closed throttle position by the accelerator return spring. If the accelerator return spring fails, the accelerator pedal will drop to the floor of the vehicle due to its own weight. This will permit the throttle to open fully at the carburetor and will cause the automobile to go out of control at full throttle. During normal conditions of operation of a vehicle, both in running condition and with the engine turned off, the accelerator return spring is fixed under tension at one end to the carburetor throttle lever or linkage and at the other end to the chassis or body of the vehicle. The tension of the spring varies as the foot pressure applied to the accelerator pedal changes, but the tension of the spring will never become zero unless the accelerator return spring fails. The spring can fail by breaking, by coming loose from one or both of its end connections, by metal fatigue, or by jamming or interfering with the spring action caused accidentally.

The present invention is directed automatically inducing an emergency stop of the vehicle's engine in case the accelerator return spring fails for any reason. According to the invention, a tension operated electrical switch is installed in series with the accelerator return spring in such a way that any failure of tension in the spring will open the ignition circuit, but the circuit will be held closed under all normal tension and normal variations in tension of the accelerator return spring. The ignition circuit provides electrical power to the ignition coil of the engine, so that failure of the accelerator return spring causes the ignition of the engine to be cut off immediately, and this stops the engine.

It is one object of the invention to provide an accelerator safety switch assembly which can be mechanically interposed between the accelerator return spring and accelerator pedal of a vehicle and electrically connected in the ignition circuit of the vehicle's engine.

A further object of this invention is to provide an accelerator safety switch assembly of the character described in which the accelerator return spring forms part of the switch assembly.

Another object is to provide a vehicle with an accelerator safety switch assembly arranged so that the accelerator return spring of the vehicle's throttle is fail-safe.

A further object is to provide an accelerator safety switch assembly which can be installed as original equipment by the manufacturer of a vehicle or which can be supplied as an accessory or adapter for installation in any existing vehicle.

Still another object is to provide an accelerator safety switch assembly which can be easily and quickly installed in a vehicle, no special tools and no particular skill being required for the installation.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view of an accelerator for safety switch assembly embodying the invention, shown installed in the throttle control system of an automotive vehicle.

FIG. 2 is an enlarged perspective view of the safety switch assembly of FIG. 1.

FIG. 3 is a further enlarged longitudinal sectional view of the safety switch assembly taken on the line 3—3 of FIG. 2, the switch parts being shown in open position.

FIG. 4 is an enlarged view similar to FIG. 3, showing the switch parts in closed position.

FIG. 5 is another enlarged fragmentary cross-sectional view taken on line 5—5 of FIG. 4.

FIG. 6 is a longitudinal sectional view of another safety switch assembly according to the invention.

FIG. 7 is a fragmentary cross-sectional view taken on line 7—7 of FIG. 6.

FIG. 8 is a side view similar to FIG. 1, showing a further safety switch assembly.

FIG. 9 is an enlarged central sectional view, similar to FIG. 4, but showing internal construction of the safety switch assembly of FIG. 8, portions of the assembly being broken away, the switch parts being shown in closed position.

Referring first to FIG. 1, there are shown parts of a vehicle 10 having a throttle system 20 for engine 25. The throttle system includes a throttle lever 26 at carburetor 28. Connected to the lever 26 is a link 30. Lever 32 is pivotally joined at one end to link 30 and at the other end the lever is pivotally joined to a stationary support 36. Link 38 connects the lever 32 and accelerator pedal 40 hinged to floor 44 of vehicle 10. The throttle system is basically conventional. The safety switch assembly 50 embodying the invention is interposed in the throttle system.

Safety switch assembly 50 has a generally cylindrical housing 52 with a tubular forward section 54 narrower in diameter than rear tubular section 56. Section 54 has a closed circular end 58; see FIGS. 2, 3, 4. Section 56 has a circular end or head 60 secured by welding 61 to the end of the housing section. In section 54 of the housing is a helical coil spring 62. This spring is the accelerator return spring for the throttle system of the engine. At its forward end, spring 62 is engaged on a bar 64 connected to a rod 66. Rod 66 extends slidably through opening 68 in end 58 of housing section 54. An eye nut 70 secured on the forward end of rod 66 is engaged by pin 72 at the pivotal joint of link 30 and lever 32. The rear end of spring 62 is engaged on bar 74 secured on the forward end of rod 73. The rod forms part of a spring biased switch 75 in the housing.

Switch 75 includes a coil spring 76 mounted on rod 73 and disposed in section 56 of the housing 52. Rods 66, 73 and helical coil springs 62, 76 are all axially aligned in housing 52. The forward end of spring 76 bears on a circular partition 78 seated in the forward end of section 56 against annular wall 80 between sections 54 and 56. Connected to the rear end of rod 73 is a cylindrical body 82 made of insulative material. The rear end of spring 76 bears against body 82. A circumferential groove 84 is provided in the periphery of body 82. In this groove is an electrically conductive ring 86 which serves as a switch contact. The rear end of rod 73 extends out of body 82 and is formed with a head 88. A generally circular plate 90 is secured on the end of rod 73 between head 88 and body 82. This plate is formed with a peripheral flange 91. A ridge 92 is formed internally of the wall of section 56. Flange 91 contacts ridge 92 when the switch body is moved forwardly as shown clearly in FIG. 4. Holes 93, 93a, 93b in partition 78, plate 91 and housing sections 54, 56 relieve air pressure inside the housing.

Two electrically conductive plugs 94, 96 are seated in insulative grommets 95 at diametrically opposite points of housing section 56. Conductive contact elements 97, 98 bear against body 82 under spring bias of compressed springs 99 disposed in cavities 100 of plugs 94, 96. Screws 102 at outer ends of the plugs engage wires 104, 106 connected in the ignition circuits 105 of the engine 25. Wire 104 may be connected to the ignition coil 107 and wire 106 can be connected to the ignition switch 108. Both coil 107 and switch 108 are shown diagrammatically in FIG. 1. At the head end 60 of the housing is an eye bolt 110 pivotally secured to bracket 112 on wall 44 of the body of vehicle 10.

The safety switch assembly 50 will be installed in vehicle 10 as shown in FIG. 1. The parts of switch 75 will then assume the position shown in FIG. 4. Spring 62 will be lengthened under tension. Spring 76 will be compressed and contact elements 97, 98 will be direct electrical circuit through ring 86 against which both elements bear as shown best in FIG. 5. The accelerator will be operated in normal fashion by pressing downwardly on pedal 40 which will move anti-clockwise as viewed in FIG. 1. When the switch 108 is closed the ignition circuit 105 is closed through battery 109. While the engine is running, any change in position of the pedal 40 will vary the tension of spring 62. The minimum tension will be exerted when the pedal 40 is released. At this time the switch parts have the position shown in FIG. 4. The switch parts will remain in this closed position at all times during operation or release of the pedal 40.

If spring 62 breaks or becomes inoperative for any reason so that tension on rod 73 is released, the rod will be retracted by spring 76 which expands to the position shown in FIG. 3. Then the ignition circuit will open because the switch 75 opens. At this time contact elements 97, 98 bear only on the nonconductive part of body 82, while ring 86 is retracted rearwardly. When the ignition circuit opens the engine will stop running.

It will be apparent that the switch assembly renders the throttle system fail-safe. Loss in tension of spring 62 results in stopping the engine. The initial tension in spring 62 can be adjusted by adjusting throttle lever control screw 115 at the carburetor of the engine. This screw bears against lever 26 and adjustably positions it for setting the idling position of the carburetor.

FIGS. 6 and 7 show another safety switch assembly 50A which is generally similar to assembly 50 with corresponding parts identically numbered. In assembly 50A, housing 52a is similar to housing 52 with a shorter forward tubular section 54a and wider rear section 56a. Rod 66a is engaged with accelerator return spring 62a in section 54a. Spring 62a in turn is engaged with slidable rod 73a of switch 75a. Rod 73a is made of rigid insulation material. It is integral with a cylindrical body 120 on its rear end.

The rear end of helical coil spring 76a bears against body 120. The forward end of the spring bears against partition 78 as in assembly 50. On the rear end of rod 73a secured by a screw 122 is a circular electrically conductive plate 124. This plate serves as a contact element of switch 75a. Plate 124 has a ridge 125 which bridges fixed contact elements 97a, 98a, when the switch is closed as shown in FIG. 6. Elements 97a, 98a are L-shaped and are secured by pins 126 to insulators 128 mounted at diametrically opposite positions on the inside wall housing section 56a. Wires 104 and 106 connected in the ignition circuit of a vehicle are connected to elements 97a, 98a respectively inside housing 52a to protect the connections to the switch elements. The wires are insulated and extend out of the housing through hole 129 in head 60a of the housing. Head 60a can be attached by screw threads 61' to housing section 56a.

When tension on the accelerator return spring 62a is released due to breaking of the spring or for some other cause, spring 76a expands and contact plate 124 moves rearwardly to the dotted line position shown in FIG. 6. Assembly 50A is connected in the throttle system of a vehicle in the same manner as assembly 50 shown in FIG. 1, to tension spring 62a.

In FIGS. 8 and 9, vehicle 10A has a throttle system 20a which is generally similar to system 20 of FIG. 1, and corresponding parts are identically numbered. System 20a includes accelerator return spring 62b which is located outside of housing 52b of the safety switch assembly 50B. Housing 52b is a cylindrical member with a cylindrical wall 130 and circular end walls 58b and 60b. Rod 131 is secured to a stationary cylindrical insulated member 132, located in the housing. The rod extends through a hole 134 in wall 58b and its eye 135 is engaged with the rear end of helical coil spring 62b. The forward end of spring 62b is connected to rod 66b pivotally joined by eye nut 70 to pin 72 at the linkage of the throttle system.

On member 132 is mounted an electrical contact ring 138. Connected to this ring is a bolt 140 in a grommet 142. The bolt extends radially outward of housing 52b and engages wire 106 by means of nut 144 on the end of the bolt.

A cylindrical insulated body 146 is slidably disposed inside the housing 52b. This body carries an electrically conductive ring 150 seated in a groove 154. The two rings 138 and 150 contact each other when spring 62a is under tension. Connected to body 146 is a rod 152 which extends slidably through a boss 153 in end wall 60b of the housing. Rod 152 is pivotally joined to bracket 112 on wall 44 of the vehicle 10a. A coil spring 76b is mounted on rod 152 and is compressed when spring 62b is under tension since the tension in spring 62a is transferred through the housing and contact rings 138, 150 to rod 152, bracket 112 and wall 44. Wire 104 is connected to fixed plug 160 by a screw 162. This plug is seated in insulated grommet 164 in the side of wall 130. Contact element 165 is a spring finger carried by the plug. This element contacts ring 150 when ring 150 is moved rearwardly to contact ring 138. When body 146 moves forwardly to the dotted line position indicated in FIG. 9, the contacts of ring 150 with both ring 138 and element 165 are broken. This opens the ignition circuit of the vehicle in which assembly 50B is installed.

Assembly 50B operates like assemblies 50 and 50A in causing opening of switch 146 when the tension in the accelerator return spring 62b is reduced below a certain critical magnitude. This reduction in tension can be caused by breaking of the spring, loss in elasticity or for some other reason. In any case, the ignition circuit of the engine of the vehicle will be opened automatically to stop the engine.

The assembly 50B is particularly well adapted for installation in any existing engine already provided with an accelerator return spring. Assemblies 50 and 50A are better adapted for installation in vehicles as original equipment by the manufacturer, although these assemblies too can be used in existing vehicles. If assemblies 50 or 50A are to be installed in an existing vehicle the original accelerator return spring will be removed. Its function will be performed by the accelerator return spring 62 or 62a inside the housing of the safety switch assembly. Assembly 50A may be preferred where space is very limited. All assemblies can be installed in a short time and with ease. No particular skill is required and only simple tools such as a screwdriver or wrench are used. No alteration in the accelerator or throttle system is required. The assemblies are foolproof in operation. They require no maintenance and will provide long, useful service.

What is claimed is:

1. A spring actuated accelerator safety switch assembly for an engine in a vehicle, comprising a generally cylindrical housing having narrower forward and wide rear sections, a circular partition seated in the forward end of the rear section, a radially-extending first electrical conductive switch member insulatingly secured in a fixed position in the rear section of the housing, a body of insulative material movably disposed in the rear section of said housing, a rod with a head extending through said insulative body and slidable through said partition, a first helical coil compression spring surrounding said rod and reacting between said insulative body and said partition, an electrically conductive contact ring surrounding said insulative body and normally held out of contact with the first switch member by said compression spring when the spring is expanded, a second helical coil tension spring disposed in the forward section of the housing stronger in tension than the first spring in compression, rod means extending through the forward end of the forward section of the housing for connecting one end of said section spring to lever of an engine throttle system for tensioning the section spring, means operatively connecting the other end of the section spring to said rod slidably through the partition for compressing the compression spring and bringing said electrical contact ring into contact with said switch member, a second radially-extending electrically conductive switch member secured to said housing in a position opposite to the first switch member and disposed to contact said body contact ring and be bridged with the first switch member when said first spring is fully compressed and thereby to close the circuit between the switch members, a circular plate secured to the rear end of the contact ring body by the head of the rod extending therethrough, said plate having peripheral flange slidable over the inner surface of the cylindrical housing, said housing having a peripheral ridge adjacent to switch members for engagement of the peripheral flange of the circular plate thereby to limit the forward movement of the ring contact body, and means for connecting wires of an ignition circuit to said first and second switch members respectively whereby the ignition circuit of the vehicle engine will be closed through the switch members and the body contact ring when said first spring is compressed and while the second spring has a tension of a predetermined magnitude thereupon and will be opened at the switch members when the tension in the second spring falls below the said predetermined magnitude so that the compression spring expands to move said body and contact ring rearwardly away from the opposing first and second switch members, the said second spring serving as an accelerator return spring with its rod means extending outside the housing at one end thereof for connection with the vehicle engine accelerator linkage system and means extending from the rear end of the rear housing for anchoring the assembly upon the vehicle.

References Cited

UNITED STATES PATENTS

| | | | |
|---|---|---|---|
| 2,514,673 | 7/1950 | Rider | 200—594 |
| 3,121,214 | 2/1964 | Frederick | 200—61.89 |
| 3,273,552 | 9/1966 | Plath | 200—61.89 XR |
| 1,617,862 | 2/1927 | Pistor | 200—16 XR |
| 2,110,171 | 3/1938 | Peters | 200—16 |
| 1,860,972 | 5/1932 | Wulfhorst | 200—16 |
| 1,598,932 | 9/1926 | Pettus | 200—61.89 |

ROBERT K. SCHAEFER, Primary Examiner

M. GINSBURG, Assistant Examiner